United States Patent
Kanegae et al.

(10) Patent No.: US 11,524,654 B2
(45) Date of Patent: Dec. 13, 2022

(54) OCCUPANT PROTECTION DEVICE

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/400,613

(22) Filed: Aug. 12, 2021

(65) Prior Publication Data
US 2022/0063555 A1 Mar. 3, 2022

(30) Foreign Application Priority Data
Aug. 26, 2020 (JP) .............................. JP2020-142743

(51) Int. Cl.
*B60R 22/48* (2006.01)
*B60R 21/18* (2006.01)
(Continued)

(52) U.S. Cl.
CPC .......... *B60R 22/48* (2013.01); *B60R 21/0136* (2013.01); *B60R 21/18* (2013.01); *B60R 22/343* (2013.01); *B60R 2021/01225* (2013.01)

(58) Field of Classification Search
CPC ..... B60R 21/18; B60R 22/48; B60R 21/0136; B60R 22/343; B60R 22/35; B60R 22/36;
(Continued)

(56) References Cited

U.S. PATENT DOCUMENTS

2005/0263990 A1* 12/2005 Clute ...................... B60R 21/18
  280/733
2006/0220361 A1* 10/2006 Kokeguchi ........... B60R 21/201
  280/733
(Continued)

FOREIGN PATENT DOCUMENTS

DE  102011116146 A1 * 4/2013 ............. B60R 21/18
JP  2015-39945 A    3/2015

OTHER PUBLICATIONS

Specht, Three-point Safety Belt System For Motor Car, Has Inflatable Gas Cushion Moved To Lower Side Of Belt Strap And In Direction Of Lower Anchorage Point During Inflation, And Comprising Guide Unit That Extends Transverse To Belt . . . , Apr. 18, 2013, EPO, DE 102011116146 A1, Machine Translation of De (Year: 2013).*

*Primary Examiner* — Paul N Dickson
*Assistant Examiner* — Matthew D Lee
(74) *Attorney, Agent, or Firm* — Troutman Pepper Hamilton Sanders LLP

(57) ABSTRACT

An occupant protection device for a vehicle includes a collision detector, a main airbag, a belt airbag, a belt controller, a distance detector, and an airbag controller. The collision detector detects a collision of the vehicle. In response to the collision detector detecting the collision, the main airbag deploys from a storage position toward an occupant seated on a seat of the vehicle. The belt airbag is stored in a seatbelt. The belt controller controls winding of the seatbelt, extraction of the seatbelt, and prohibition of the extraction of the seatbelt. The distance detector detects a distance from the storage position to the occupant. When the collision detector detects the collision of the vehicle and the detected distance is equal to or greater than a predetermined distance, the airbag controller deploys the belt airbag from
(Continued)

within the seatbelt without causing the belt controller to prohibit the extraction of the seatbelt.

5 Claims, 5 Drawing Sheets

(51) Int. Cl.
 *B60R 22/343* (2006.01)
 *B60R 21/0136* (2006.01)
 *B60R 21/01* (2006.01)
(58) Field of Classification Search
 CPC .................. B60R 22/405; B60R 22/41; B60R 2021/01225; B60R 2021/01265; B60R 21/0134
 See application file for complete search history.

(56) References Cited

U.S. PATENT DOCUMENTS

| 2015/0054264 | A1  | 2/2015  | Hirako   |             |
|--------------|-----|---------|----------|-------------|
| 2016/0075299 | A1* | 3/2016  | Wang     | B60R 22/34  |
|              |     |         |          | 280/733     |
| 2019/0299896 | A1* | 10/2019 | Nagasawa | B60R 22/26  |
| 2022/0063555 | A1* | 3/2022  | Kanegae  | B60R 22/343 |

\* cited by examiner

OCCUPANT PROTECTION DEVICE

CROSS-REFERENCE TO RELATED APPLICATION

The present application claims priority from Japanese Patent Application No. 2020-142743 filed on Aug. 26, 2020, the entire contents of which are hereby incorporated by reference.

BACKGROUND

The disclosure relates to an occupant protection device.

In order to protect an occupant from a collision, airbag devices are provided as occupant protection devices in vehicles such as automobiles.

The airbag device generally includes an impact sensor, an inflator, an airbag, and a control device. The airbag is stored in an instrument panel in a front part of the vehicle. In response to the impact sensor detecting an impact due to a frontal collision, the airbag device inflates the airbag from the front part of the vehicle by the inflator and deploys the airbag in front of the occupant who is seated on a seat, so as to reduce the impact caused by a sudden forward movement of the occupant and protect the occupant.

There has been also so-called air belt devices including an airbag mounted on a seatbelt for a purpose of occupant protection. For example, the following device has been proposed as the air belt device. That is, the device includes a shoulder belt that is worn from a shoulder (located on one side in a seat width direction) of the occupant who is seated on a vehicle seat to a waist on the other side in the seat width direction. The shoulder belt includes an inflation portion. The inflation portion is inflated by supplied gas, and a portion of the inflation portion on a head side of the occupant with respect to a center line of the shoulder belt in the width direction is deployed to be larger than a portion of the inflation portion on an opposite side to the head side. Accordingly, this air belt device ensures performance to protect the head of the occupant while preventing an increase in a capacity of the inflation portion (see Japanese Unexamined Patent Application Publication (JP-A) No. 2015-039945).

SUMMARY

An aspect of the disclosure provides an occupant protection device for a vehicle. The occupant protection device includes a collision detector, a main airbag, a belt airbag, a belt controller, a distance detector, and an airbag controller. The collision detector is configured to detect a collision of the vehicle. The main airbag is configured to, in response to the collision detector detecting the collision of the vehicle, deploy from a predetermined storage position toward an occupant who is to be seated on a seat of the vehicle. The storage position is located in front of the seat. The belt airbag is stored in a seatbelt configured to restrain the occupant. The belt controller is configured to control winding of the seatbelt, extraction of the seatbelt, and prohibition of the extraction of the seatbelt. The distance detector is configured to detect a distance from the storage position of the main airbag to the occupant or the seat where the occupant is seated. The airbag controller is configured to, when (i) the collision detector detects the collision of the vehicle and (ii) the distance is equal to or greater than a predetermined distance, deploy the belt airbag from within the seatbelt without causing the belt controller to prohibit the extraction of the seatbelt for a predetermined time period.

An aspect of the disclosure provides an occupant protection device for a vehicle. The occupant protection device includes first circuitry, a main airbag, a belt airbag, a belt controller, and second circuitry. The first circuitry is configured to detect a collision of the vehicle. The main airbag is configured to, in response to the first circuitry detecting the collision of the vehicle, deploy from a predetermined storage position toward an occupant who is to be seated on a seat of the vehicle. The storage position is located in front of the seat. The belt airbag is stored in a seatbelt configured to restrain the occupant. The belt controller is configured to control winding of the seatbelt, extraction of the seatbelt, and prohibition of the extraction of the seatbelt. The second circuitry is configured to detect a distance from the storage position of the main airbag to the occupant or the seat where the occupant is seated. The second circuitry is configured to, when (i) the first circuitry detects the collision of the vehicle and (ii) the distance is equal to or greater than a predetermined distance, deploy the belt airbag from within the seatbelt without causing the belt controller to prohibit the extraction of the seatbelt for a predetermined time period.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Further, in order to protect an occupant against a large impact and protect a head and a neck of the occupant on which a shoulder belt is not worn, a size of an inflation portion is to be increased as compared with that in the related art. In this case, the inflation portion of the air belt device in the related art may not have a sufficient reaction force.

When the airbag is deployed from a front side, if a seated position of the occupant is closer to a rear side of the vehicle than a normal seated position due to movement of the seat by a seat slide or a seat lifter, a distance between the airbag and the occupant is long. In this case, the airbag may not reach the occupant, or it may take time for the airbag to reach the occupant. Accordingly, the neck of the occupant may be greatly shaken forward and backward, and the occupant may not be appropriately protected, which may increase a load on the neck of the occupant.

It is desirable to provide an occupant protection device capable of enhancing an occupant protection function in an event of a collision of a vehicle.

Hereinafter, an embodiment of the disclosure will be described with reference to the accompanying drawings.

Figure 1A:
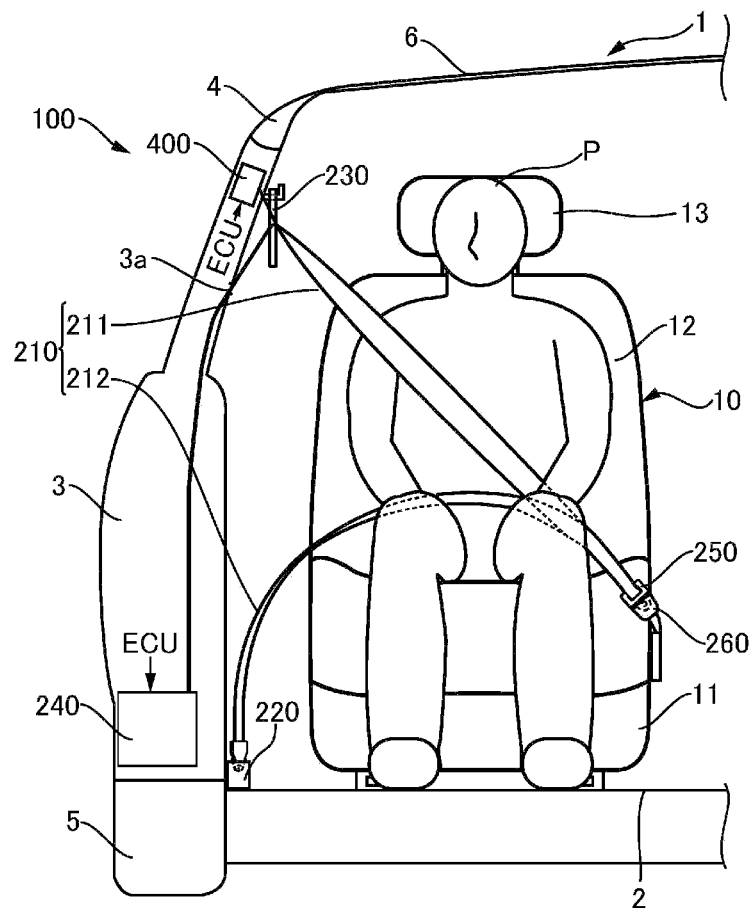
FIGS. 1A and 1B are a front cross-sectional view and a side cross-sectional view schematically illustrating a vehicle including an occupant protection device according to an embodiment of the disclosure.
Figure 1B:
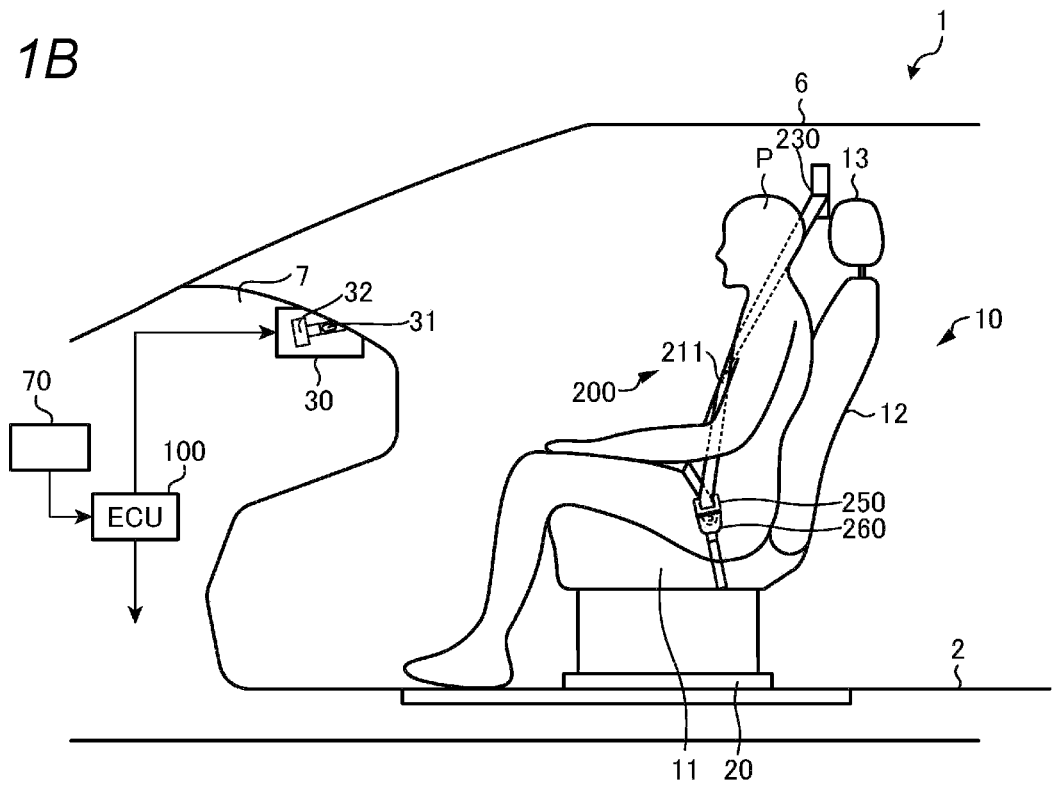
Figure 2A:
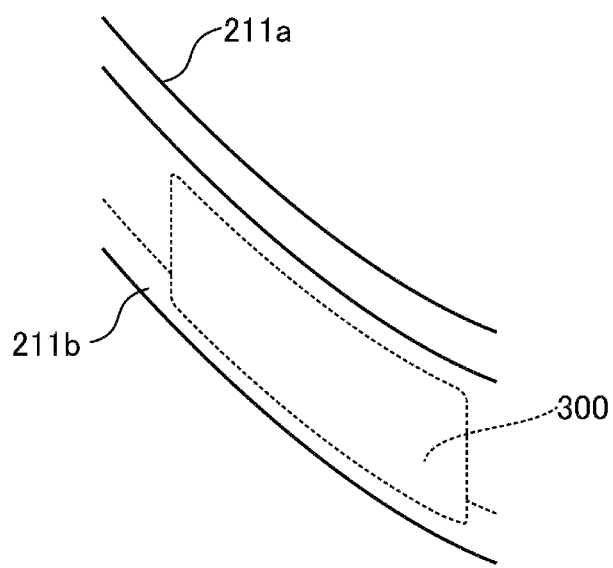
FIGS. 2A and 2B are schematic front views illustrating a storage form of a belt airbag included in a seatbelt according to the present embodiment.
Figure 2B:
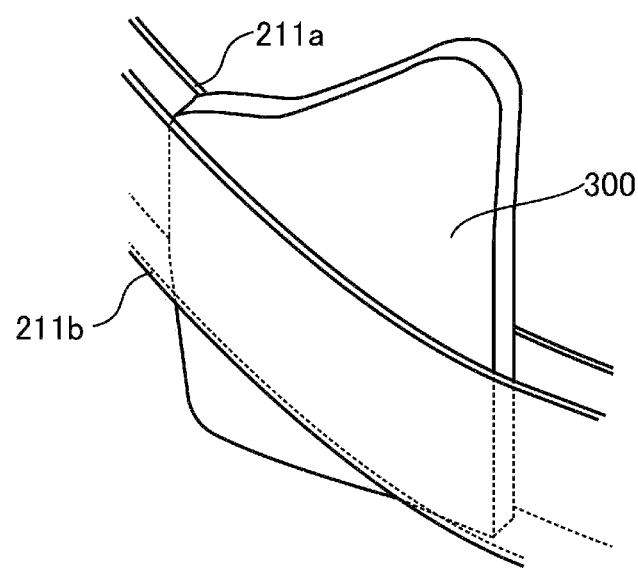

FIGS. 1A and 1B are a front cross-sectional view and a side cross-sectional view schematically illustrating a vehicle including an occupant protection device according to the embodiment of the disclosure. FIGS. 2A and 2B are schematic front views illustrating a storage form of a belt airbag included in a seatbelt according to the present embodiment.

As illustrated in FIGS. 1A and 1B, a seat 10 is provided on a floor surface 2 of a vehicle 1 (that is a portion where a floor panel of an underbody is provided). Right and left center pillars 3 constituting inner side walls of a vehicle body are disposed on outer portions of the floor surface 2 in a vehicle width direction (that is, exterior portions of the vehicle). The right and left center pillars 3 are opposite to each other. An upper end of the center pillar 3 is permanently affixed to and coupled to a roof side rail 4. A lower end of the center pillar 3 is permanently affixed to and coupled to a side sill 5. A roof 6 is provided substantially horizontally at an upper portion of the roof side rail 4. An instrument panel 7 is provided in a front part of the vehicle 1.

A main airbag device 30 is provided inside the instrument panel 7.

Each seat 10 is provided with a seatbelt device 200 and an occupant protection device. The seatbelt device 200 of the right seat 10 and the seatbelt device 200 of the left seat 10 are symmetrically provided.

In the following, the occupant protection device provided in the right seat 10 (left side in FIG. 1A) will be described.

The seat 10 includes a seat cushion 11 (seat member) that supports buttocks to thighs of an occupant P, a seat back 12 (backrest member) that is reclinable, and a headrest 13 (head member) that supports a head of the occupant P.

The seat 10 is provided with a seat slide device 20. The seat slide device 20 allows the occupant P to adjust a front-rear position of the seat 10. The seat slide device 20 may be a device that can automatically adjust the front-rear position of the seat 10 regardless of the operation of the occupant P. As will be described later, the position of the seat 10 determined here is used as a position of the occupant P who is seated on the seat 10.

The main airbag device 30 is controlled by an ECU 100 to reduce an impact on the occupant P caused by a forward movement of the occupant P, and protect the occupant. The main airbag device 30 includes a main airbag 31 and a main inflator 32.

The main airbag 31 is a bag body into which gas is introduced by the main inflator 32, and is folded into a small size when not actuated. When the gas is introduced from the main inflator 32, the main airbag 31 is inflated and deployed from the instrument panel 7 toward the seat 10, thereby reducing the impact of the collision of the vehicle 1 mainly on the head and chest of the occupant P.

The main inflator 32 ignites an explosive in accordance with an actuation signal input from a collision detection device 70 via the ECU 100, to generate gas by a chemical reaction caused by combustion. The actual signal is based on detection or prediction of collision of the vehicle 1. The gas generated by the main inflator 32 is introduced into the main airbag 31.

The collision detection device 70 detects or predicts the collision of the vehicle 1. For example, the collision detection device 70 detects and predicts a collision of the vehicle 1 from the front (that is, detects and predicts a front collision of the vehicle 1). In response to the collision detection device 70 detecting or predicting the collision, the collision detection device 70 transmits a collision detection signal or a collision prediction signal to the ECU 100. Accordingly, the collision detection device 70 actuates the main inflator 32 and a belt inflator 400 (which will be described later) via the ECU 100 when the collision is detected or predicted.

In the present embodiment, the collision detection device 70 performs both detection of the collision of the vehicle 1 and prediction of the collision of the vehicle 1. The disclosure is not limited thereto. The collision detection device 70 may simply predict the collision of the vehicle 1 or may simply detect the collision of the vehicle 1.

In the present embodiment, the collision detection device 70 and the ECU 100 are separate components. Alternatively, the collision detection device 70 may not be provided, and the ECU 100 may serve as the collision detection device 70.

The ECU 100 controls the entire vehicle 1. The ECU 100 includes a central processing unit (CPU), a read only memory (ROM) that stores a control program executed by the CPU, a data table, commands, and data, a random access memory (RAM) that temporarily stores data, an electrically erasable and programmable read only memory (EEPROM) including a rewritable nonvolatile memory, and an input and output interface circuit. The ECU 100 supervises control of the vehicle 1.

The ECU 100 receives the position of the seat 10 from the seat slide device 20, and detects the position of the occupant P who is seated on the seat 10. In one embodiment, the ECU 100 serves as a "distance detector".

The ECU 100 may detect the position of the occupant P and calculate a distance from the instrument panel 7 that stores the main airbag 31 (that is, a storage position of the main airbag 31) to the occupant P without using information from the seat slide device 20. For example, the vehicle 1 includes an onboard camera. The ECU 100 may detect the position of the occupant P based on image data received from the onboard camera and calculate the distance. In this way, the ECU 100 may detect the distance to the occupant P who is seated on the seat 10 instead of detecting the distance to the seat 10.

The ECU 100 controls a retractor 240 of the seatbelt device 200 (which will be described later) and controls permission of extraction of a webbing 210 and prohibition of the extraction of the webbing 210.

Further, as described above, when the collision detection device 70 detects or predicts the collision of the vehicle 1, the ECU 100 receives the collision detection signal or the collision prediction signal, and transmits the actuation signal to the main inflator 32 and the belt inflator 400 (which will be described later).

In one example, upon receipt of the collision detection signal or the collision prediction signal, the ECU 100 transmits the actuation signal to the main inflator 32. When determining that the distance between the instrument panel 7 and the occupant P is equal to or greater than a predetermined distance, the ECU 100 transmits the actuation signal to the belt inflator 400. Further, the ECU 100 controls the retractor 240 of the seatbelt device 200 not to prohibit extraction of the webbing 210, but to prohibit the extraction of the webbing 210 after a belt airbag 300 reaches a predetermined size. That is, the ECU 100 controls deployment of the belt airbag 300.

The seatbelt device 200 includes the webbing 210, a lap anchor 220, a shoulder anchor 230, the retractor 240, a tongue 250, and a buckle 260.

The webbing 210 is a belt-shaped belt configured to receive and reduce a collision load. A first end of the webbing 210 is fixed to the lap anchor 220. The webbing 210 is inserted into the center pillar 3 from an opening 3a of the center pillar 3 via the shoulder anchor 230. A second end of the webbing 210 is wound around the retractor 240.

The lap anchor 220 is fixed to a side wall surface of the side sill 5. The first end of the webbing 210 is fixed to the lap anchor 220 as described above.

The shoulder anchor 230 is provided on a side wall of the center pillar 3 above the shoulder of the occupant P who is seated on the seat 10. The webbing 210 is slidably inserted through the shoulder anchor 230. That is, the shoulder anchor 230 is provided on an outer side in the vehicle width direction. The webbing 210 (specifically, a shoulder belt portion 211 described later) is extracted. The opening 3a of the center pillar 3 is provided in the vicinity of the shoulder anchor 230.

The retractor 240 is a winding device configured to wind the webbing 210 and locks the webbing 210 (prohibits extraction of the webbing 210) in an emergency. The retractor 240 is provided inside the center pillar 3, and supports the second end of the webbing 210 so as to be able to wind the webbing 210. The retractor 240 applies a loose tension to the webbing 210 in a winding direction. The retractor 240 locks the webbing 210 when the webbing 210 is extracted at a speed equal to or higher than a certain speed, and also locks the webbing 210 when acceleration equal to or higher than a certain acceleration is applied to the vehicle body.

The retractor 240 is controlled by the occupant protection device (under the control of the ECU 100) to wind the webbing 210 (seatbelt), extract the webbing 210, and lock the webbing 210 (prohibit the extraction of the webbing 210).

The tongue 250 is a T-shaped connection member for coupling with the buckle 260. The tongue 250 is a plate-shaped member having an insertion hole and a coupling hole. The webbing 210 is inserted through the insertion hole of the tongue 250. The tongue 250 is slidable with respect to the webbing 210. The coupling hole of the tongue 250 is provided for coupling with the buckle 260.

The buckle 260 is a coupling component to which the tongue 250 is detachably attached. The buckle 260 can firmly fix the tongue 250 even with a small force. The buckle 260 is provided at an inner side of the seat cushion 11 of the seat 10 in the vehicle width direction (that is, on a vehicle center side). When the tongue 250 is inserted into the buckle 260, the buckle 260 locks and fixes the coupling hole of the tongue 250. When a release button of the buckle 260 is operated, the tongue 250 is detached, so that the tongue 250 can be easily attached and detached.

In a state in which the tongue 250 through which the webbing 210 is inserted is inserted into and locked to the buckle 260, a portion of the webbing 210 from the shoulder anchor 230 to the tongue 250 is the shoulder belt portion 211 (shoulder belt), and a portion of the webbing 210 from the tongue 250 to the lap anchor 220 is a lap belt portion 212 (lap belt). That is, the webbing 210 includes the shoulder belt portion 211 configured to restrain the occupant P from a right shoulder to a left waist through a front chest, and the lap belt portion 212 configured to restrain the occupant P from the left waist to a right waist through the front.

As illustrated in FIGS. 2A and 2B, the shoulder belt portion 211 of the webbing 210 has a double-layered structure. The shoulder belt portion 211 includes a first shoulder belt portion 211a that is to be in contact with the occupant P (that is, located on an occupant side) and a second shoulder belt portion 211b that is located on an outer side and that is to be located on a vehicle front side when the webbing 210 is worn.

In the present embodiment, the shoulder belt portion 211 has the double-layered structure, and the belt airbag 300 is provided between the layers of the shoulder belt portion 211 as will be described later. It is noted that the disclosure is not limited thereto. The shoulder belt portion 211 may be provided as a single structure, the belt airbag 300 may be provided on the inside (the side that is to be in contact with the occupant P), and the shoulder belt portion 211 may be provided on the outer side (that is, the vehicle front side). Further alternatively, the shoulder belt portion 211 may have a three or more layers structure, and the belt airbag 300 may be provided at a predetermined position. In order to easily achieve the reactive force of the belt airbag 300, one layer of the shoulder belt portion 211 may be provided on the outer side of the belt airbag 300 (that is, the vehicle front side).

The belt airbag 300 is provided inside the shoulder belt portion 211. The belt airbag 300 is deployed by the belt inflator 400 in response to detection or prediction of the collision of the vehicle 1. The belt airbag 300 is provided between the first shoulder belt portion 211a and the second shoulder belt portion 211b.

Gas can be supplied from the belt inflator 400 to the inside of the belt airbag 300. When the belt airbag 300 is supplied with the gas from the belt inflator 400, the belt airbag 300 is inflated and deployed toward the neck or head of the occupant P from between the first shoulder belt portion 211a and the second shoulder belt portion 211b. For example, the belt airbag 300 is deployed in a so-called heart shape in which a portion of the belt airbag 300 corresponding to a lower jaw of the occupant P is at a low position and portions of the belt airbag 300 corresponding to both shoulders of the occupant P are at high positions. By deploying the belt airbag 300 in such a shape, it is possible to receive pressure at the shoulders without strangling the neck of the occupant P, and it is possible to safely restrain the occupant.

When the shoulder belt portion 211 is worn, the belt airbag 300 has a curved round shape along the shape of the shoulder belt portion 211. When deployed, the belt airbag 300 is deployed with this round shape as it is.

The belt airbag 300 may be deployed simply upward from the shoulder belt portion 211. If the belt airbag 300 is deployed in up and down directions, the reactive force of the belt airbag 300 by the shoulder belt portion 211 is more likely to be uniformly applied.

Further, in an upper deployment portion of the belt airbag 300, a lower portion of the belt airbag 300 that is close to the tongue 250 is deployed larger than an upper portion of the belt airbag 300 that is close to the shoulder anchor 230 and is away from the tongue 250. That is, a portion of the belt airbag 300 closer to a center of the seat 10 in the vehicle width direction is deployed larger than a portion of the belt airbag 300 corresponding to the outer side of the seat (the right side of the occupant).

The belt inflator 400 supplies the gas to the belt airbag 300. In one example, when the collision detection device 70 detects or predicts the collision of the vehicle 1, the belt inflator 400 is actuated via the ECU 100, ignites the explosive based on the actuation signal transmitted from the ECU 100, generates the gas by the chemical reaction due to combustion, supplies the gas to the belt airbag 300, and deploys the belt airbag 300.

The occupant protection device according to the present embodiment includes the main airbag device 30, the collision detection device 70, the ECU 100, the seatbelt device 200, the belt airbag 300, and the belt inflator 400. The occupant protection device is operated under the control of the ECU 100.

Hereinafter, occupant protection control of the ECU 100 in the occupant protection device will be described.

Figure 3:
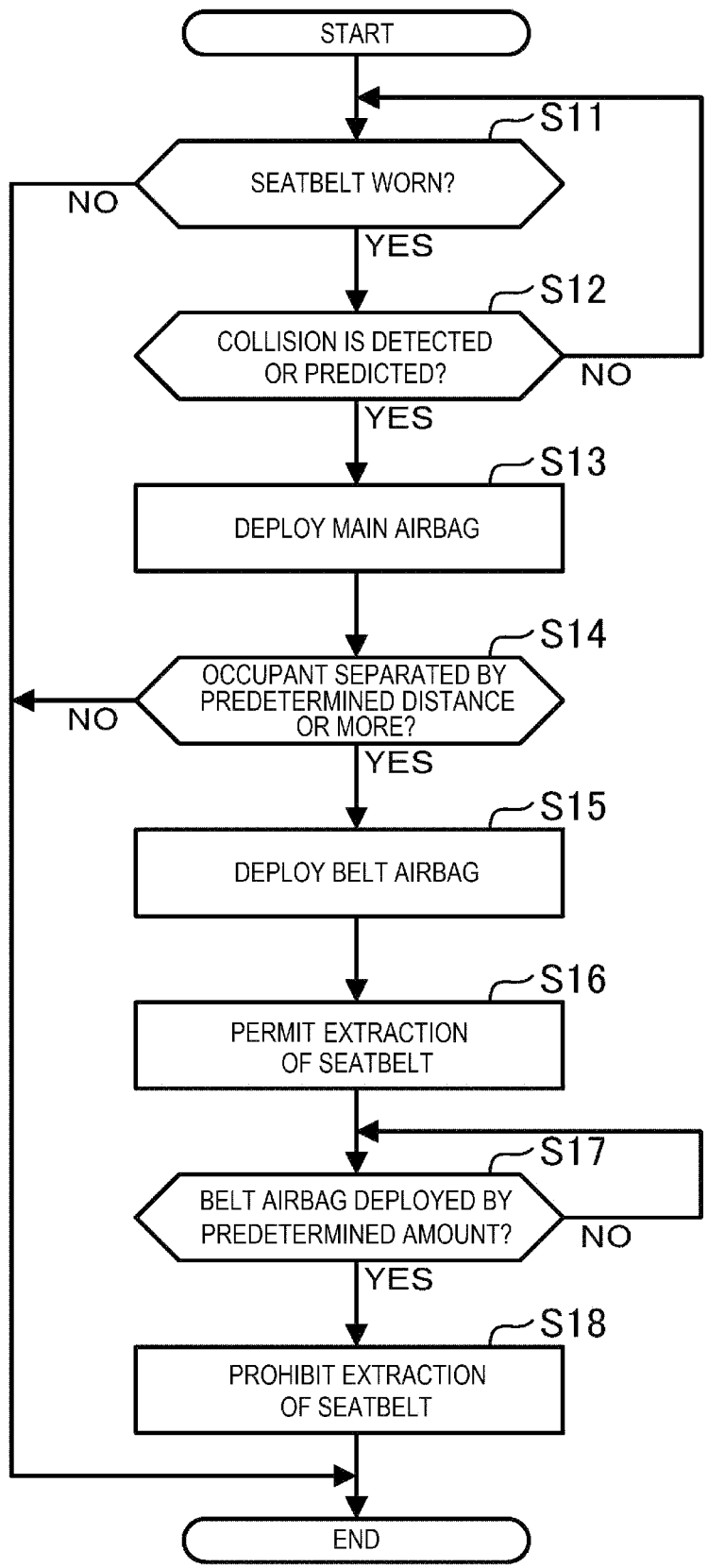
FIG. 3 is a flowchart of occupant protection control by an ECU in the occupant protection device.

FIG. 3 is a flowchart illustrating the occupant protection control of the ECU 100 in the occupant protection device. FIGS. 4A to 4D are side views illustrating outlines of operations of the main airbag 31 and the belt airbag 300 in the occupant protection control. FIGS. 5A to 5D are front views illustrating the outlines of the operation of the belt airbag 300 in the occupant protection control.

First, the ECU 100 determines whether the seatbelt device 200 is worn (step S11). In one example, the ECU 100 determines whether the tongue 250 is inserted into and engaged with the buckle 260. When the ECU 100 determines that the seatbelt device 200 is worn, the ECU proceeds to step S12. When the ECU 100 determines that the seatbelt device 200 is not worn, the ECU 100 ends the occupant protection control of the belt airbag 300.

The ECU 100 sets the seat 10, to which the seatbelt device 200 is determined to be worn, as the seat 10 of an occupant protection target, and enters an operation ready state. In one example, the belt inflator 400 for the target seat 10 is a target to which a signal is to be output from the collision detection device 70 via the ECU 100.

When the ECU 100 determines that the seatbelt device 200 is worn (YES in step S11), the ECU 100 determines whether the collision of the vehicle 1 is detected or predicted (step S12). In one example, the ECU 100 determines whether the collision detection signal or the collision prediction signal of the vehicle 1 is received from the collision detection device 70.

When the ECU 100 determines that the collision of the vehicle 1 is detected or predicted, the ECU 100 proceeds to step S13. When the ECU 100 determines that the collision of the vehicle 1 is neither detected nor predicted, the ECU 100 returns to step S11. When the ECU 100 determines that the collision of the vehicle 1 is neither detected nor predicted (NO in step S12) and then determines that the seatbelt device 200 is taken off (NO in step S11), the ECU 100 ends the occupant protection control of the belt airbag 300.

Figure 4A:
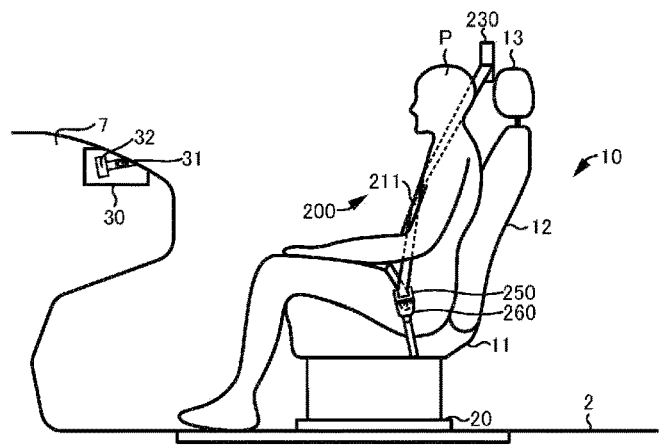
FIGS. 4A to 4D are side views illustrating outlines of operations of a main airbag and the belt airbag in the occupant protection control.
Figure 4B:
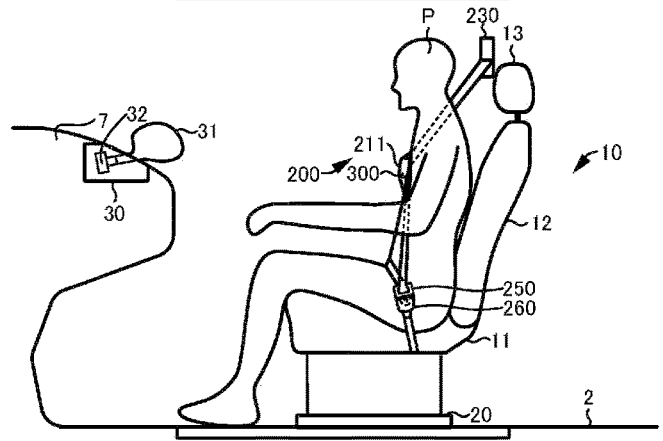

When the ECU 100 determines that the collision of the vehicle 1 is detected or predicted (YES in step S12), the ECU 100 controls the main airbag 31 to be deployed (step S13). In one example, the ECU 100 outputs an actuation signal to the target main inflator 32 to actuate the main inflator 32, thereby deploying the main airbag 31. Accordingly, as illustrated in FIG. 4B, the deployment of the main airbag 31 is started.

Next, the ECU 100 determines whether the occupant P is separated from the instrument panel 7 from which the main airbag 31 is deployed by a predetermined distance or more (step S14). In one example, the ECU 100 calculates (i) the position of the occupant P and (ii) the distance between the instrument panel 7 and the occupant P based on the position of the seat 10 input from the seat slide device 20, and determines whether the occupant P is separated from the instrument panel 7 by the predetermined distance or more. As described above, the distance may be detected based on information from an onboard camera, instead of information from the seat slide device 20.

When the ECU 100 determines that the occupant P is separated by the predetermined distance or more, the ECU 100 proceeds to step S15. When the ECU 100 determines that the occupant P is not separated by the predetermined distance or more, the ECU 100 ends the occupant protection control of the belt airbag 300.

Figure 5A:
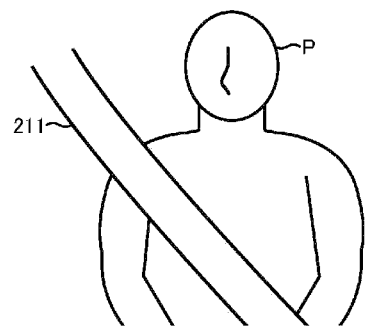
FIGS. 5A to 5D are front views illustrating the outlines of the operation of the belt airbag in the occupant protection control.
Figure 5B:
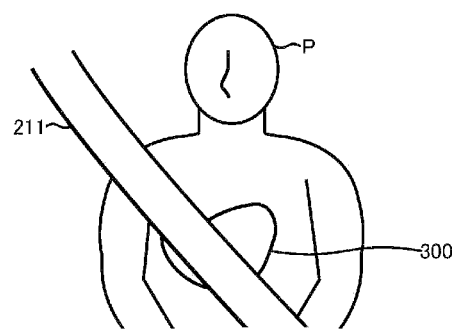
Figure 5C:
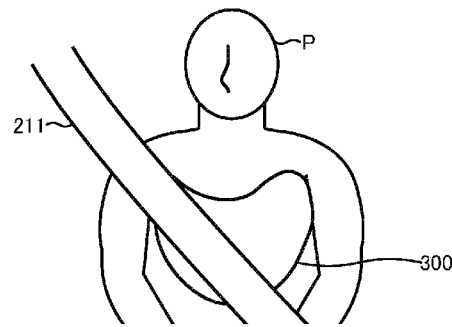
Figure 5D:
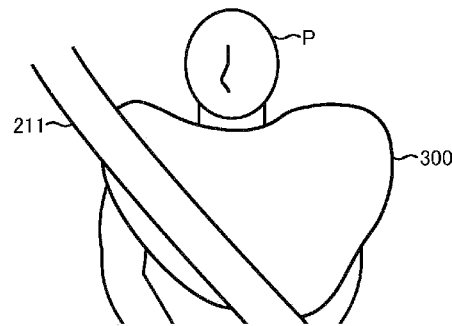

When the ECU 100 determines that the occupant P is separated by the predetermined distance or more (YES in step S14), the ECU 100 controls the belt airbag 300 to be deployed (step S15). In one example, the ECU 100 outputs the actuation signal to the target belt inflator 400 to actuate the belt inflator 400, thereby deploying the belt airbag 300. Accordingly, as illustrated in FIGS. 4B and 5B, the deployment of the belt airbag 300 is started.

The ECU 100 permits the extraction of the seatbelt (step S16). In one example, the ECU 100 controls the target retractor 240 to unlock the webbing 210, that is, release the prohibition of the extraction of the webbing 210 (and to not prohibit the extraction of the webbing 210 for a predetermined time), and to bring the webbing 210 in an extractable state (that is, in a state in which the extraction of the webbing 210 is permitted). Accordingly, the webbing 210 is extracted in accordance with the inflation of the belt airbag 300 without interfering with the inflation of the belt airbag 300.

Next, the ECU 100 determines whether the belt airbag 300 is deployed by a predetermined amount (step S17). For example, the ECU 100 measures a time from the actuation of the belt inflator 400, and calculates a deployment amount of the belt airbag 300 based on the measured time. The ECU 100 may include a sensor configured to detect a content amount of the belt airbag 300, and may detect the deployment amount of the belt airbag 300 based on a value obtained by the sensor.

When the ECU 100 determines that the belt airbag 300 is deployed by the predetermined amount, the ECU 100 proceeds to step S18. When the ECU 100 determines that the belt airbag 300 is not deployed by the predetermined amount, the ECU 100 returns to step S17 and repeats the determination until the belt airbag 300 is deployed by the predetermined amount.

When the ECU 100 determines that the belt airbag 300 is deployed by the predetermined amount (YES in step S17), the ECU 100 prohibits the extraction of the seatbelt (step S18). In one example, the ECU 100 controls the target retractor 240 to lock the webbing 210 (prohibit the extraction of the webbing 210), so that the webbing 210 is not extracted.

Figure 4C:
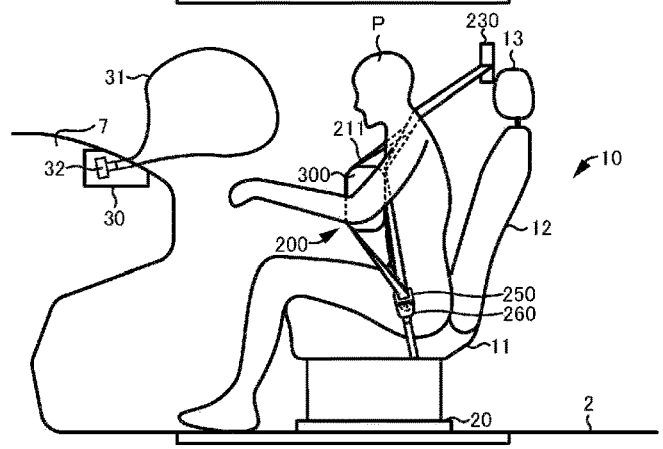

Accordingly, as illustrated in FIG. 4C, the webbing 210 prevents the belt airbag 300 from moving to the front part of the vehicle 1. Therefore, the reactive force of the belt airbag 300 can be provided by the webbing 210, the forward movement of the occupant P can be prevented, and the occupant P can be reliably protected. The belt airbag 300 may be deployed to an occupant protection state illustrated in FIG. 5D at this stage.

Figure 4D:
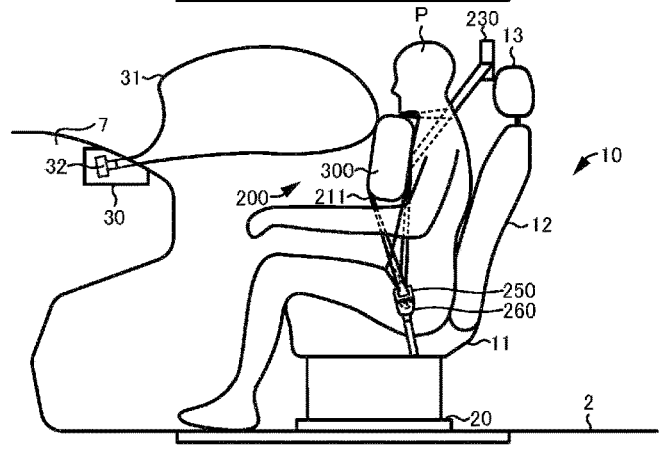

Therefore, as illustrated in FIG. 4D, a behavior of the occupant P can be limited by the belt airbag 300 and the webbing 210 before the main airbag 31 is sufficiently inflated, it can be prevented that a load is applied to the neck due to front-rear movement of the occupant P, and the occupant P can be sufficiently protected.

As described above, when the distance from the storage position of the main airbag 31 (the instrument panel 7) to the occupant P (or the seat 10 on which the occupant P is seated) is long, the occupant protection device according to the present embodiment deploys the belt airbag 300 without prohibiting the extraction of the seatbelt (the webbing 210) for a predetermined time. Therefore, the belt airbag 300 can be inflated to a sufficient size. The movement of an upper body of the occupant P can be restricted without using the main airbag 31, and the occupant P can be protected, particularly the front-rear movement of the head can be reduced and the neck can be appropriately protected.

The occupant protection device according to the present embodiment prohibits the extraction of the seatbelt (the webbing 210) after the belt airbag 300 is sufficiently deployed. Thus, both the belt airbag 300 having the reactive force and the occupant protection by the belt airbag 300 can be achieved.

In one embodiment, the collision detection device 70 may serve as a "collision detector". In one embodiment, the retractor 240 may serve as a "belt controller". In one embodiment, the ECU 100 may serve as a "distance detector" and an "airbag controller".

According to the disclosure, it is possible to provide the occupant protection device capable of enhancing an occupant protection function during an event of the collision of the vehicle.

The collision detection device 70 and the ECU 100 in FIG. 1B are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the collision detection device 70 and the ECU 100 illustrated in FIG. 1B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the collision detection device 70 and the ECU 100 illustrated in FIG. 1B.

The invention claimed is:

1. An occupant protection device for a vehicle, the occupant protection device comprising:
   a collision detector configured to detect a collision of the vehicle;
   a main airbag configured to, in response to the collision detector detecting the collision of the vehicle, deploy from a predetermined storage position toward an occupant who is to be seated on a seat of the vehicle, the storage position being located in front of the seat;
   a belt airbag stored in a seatbelt configured to restrain the occupant;
   a belt controller configured to control winding of the seatbelt, extraction of the seatbelt, and prohibition of the extraction of the seatbelt;
   a distance detector configured to detect a distance from the storage position of the main airbag to the occupant or the seat; and
   an airbag controller configured to, when (i) the collision detector detects the collision of the vehicle and (ii) the distance is equal to or greater than a predetermined distance, deploy the belt airbag from within the seatbelt without causing the belt controller to prohibit the extraction of the seatbelt for a predetermined time period.

2. The occupant protection device according to claim 1, wherein
   the distance detector is configured to detect the distance based on a position of the seat.

3. The occupant protection device according to claim 1, wherein
   the airbag controller is configured to control the belt controller to prohibit the extraction of the seatbelt when the belt airbag is deployed by a predetermined amount.

4. The occupant protection device according to claim 2, wherein
   the airbag controller is configured to control the belt controller to prohibit the extraction of the seatbelt when the belt airbag is deployed by a predetermined amount.

5. An occupant protection device for a vehicle, the occupant protection device comprising:
   first circuitry configured to detect a collision of the vehicle;
   a main airbag configured to, in response to the first circuitry detecting the collision of the vehicle, deploy from a predetermined storage position toward an occupant who is to be seated on a seat of the vehicle, the storage position being located in front of the seat;
   a belt airbag stored in a seatbelt configured to restrain the occupant;
   a belt controller configured to control winding of the seatbelt, extraction of the seatbelt, and prohibition of the extraction of the seatbelt;
   second circuitry configured to
      detect a distance from the storage position of the main airbag to the occupant or the seat where the occupant is seated; and
      when (i) the first circuitry detects the collision of the vehicle and (ii) the distance is equal to or greater than a predetermined distance, deploy the belt airbag from within the seatbelt without causing the belt controller to prohibit the extraction of the seatbelt for a predetermined time period.

* * * * *